US012615185B2

(12) United States Patent
Cheng et al.

(10) Patent No.: US 12,615,185 B2
(45) Date of Patent: Apr. 28, 2026

(54) METHOD FOR DETERMINING OPTIMAL COMPUTING AND STORING PATH OF COMPUTING POWER NETWORK AND MONITORING APPARATUS

(71) Applicant: YANGTZE DELTA INDUSTRIAL INNOVATION CENTER OF QUANTUM SCIENCE AND TECHNOLOGY, Suzhou (CN)

(72) Inventors: Qiyue Cheng, Suzhou (CN); Yulong Fu, Suzhou (CN)

(73) Assignee: YANGTZE DELTA INDUSTRIAL INNOVATION CENTER OF QUANTUM SCIENCE AND TECHNOLOGY, Suzhou (CN)

( * ) Notice: Subject to any disclaimer, the term of this patent is extended or adjusted under 35 U.S.C. 154(b) by 0 days.

(21) Appl. No.: 18/800,171

(22) Filed: Aug. 12, 2024

(65) Prior Publication Data

US 2024/0422060 A1    Dec. 19, 2024

Related U.S. Application Data

(63) Continuation of application No. PCT/CN2022/119812, filed on Sep. 20, 2022.

(30) Foreign Application Priority Data

May 27, 2022    (CN) .......................... 202210594750.0

(51) Int. Cl.
*H04L 41/0853* (2022.01)
*H04L 45/44* (2022.01)
*H04L 67/1097* (2022.01)

(52) U.S. Cl.
CPC .......... *H04L 41/0853* (2013.01); *H04L 45/44* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 2016/0191370 A1* | 6/2016 | Wood | ...................... | H04L 45/16 |
| | | | | 370/238 |
| 2019/0007305 A1* | 1/2019 | Filsfils | .................... | H04L 45/42 |
| 2022/0150154 A1* | 5/2022 | Pethe | .................... | H04W 84/18 |

OTHER PUBLICATIONS

Yuan et al., "Study Complex Networks Routing Optimization Based on Expansion Referral", Oct. 1, 2012, IEEE, 2012 IEEE 12th International Conference on Computer and Information Technology (2012, pp. 1021-1024) (Year: 2012).*

(Continued)

*Primary Examiner* — Davoud A Zand
(74) *Attorney, Agent, or Firm* — Jose Cherson Weissbrot

(57) ABSTRACT

A method for determining an optimal computing and storing path of a computing power network and a monitoring apparatus, includes: determining a maximum time efficacy entropy of the computing and storing path of the computing power network, determining a minimal time efficacy entropy, and determining a maximum time efficacy of an information stream according to the minimal time efficacy entropy; determining a minimal mass entropy according to a total mass entropy and a maximum mass entropy of the computing and storing path of the computing power network, and determining an optimal mass of the information stream according to the minimal mass entropy; and determining a joint optimization degree of the information stream according to the maximum time efficacy, the optimal mass, and a set weight coefficient, and determining the optimal computing and storing path of the computing power network according to the joint optimization degree.

10 Claims, 6 Drawing Sheets

(56)     References Cited

OTHER PUBLICATIONS

"Evaluation Model of Teaching Management System in Higher Education Based on Entropy Theory", Fuer Wu et al., Journal of Hangzhou Normal University (Natural Science Edition) . 2004 (02), dated Apr. 25, 2004.
"Entropy-based Evaluation of Postgraduate Teaching Management System in Higher Education Institutions", Xin Zan et al., Science, Technology and Engineering . 2006 (12), dated Jun. 15, 2006.

* cited by examiner

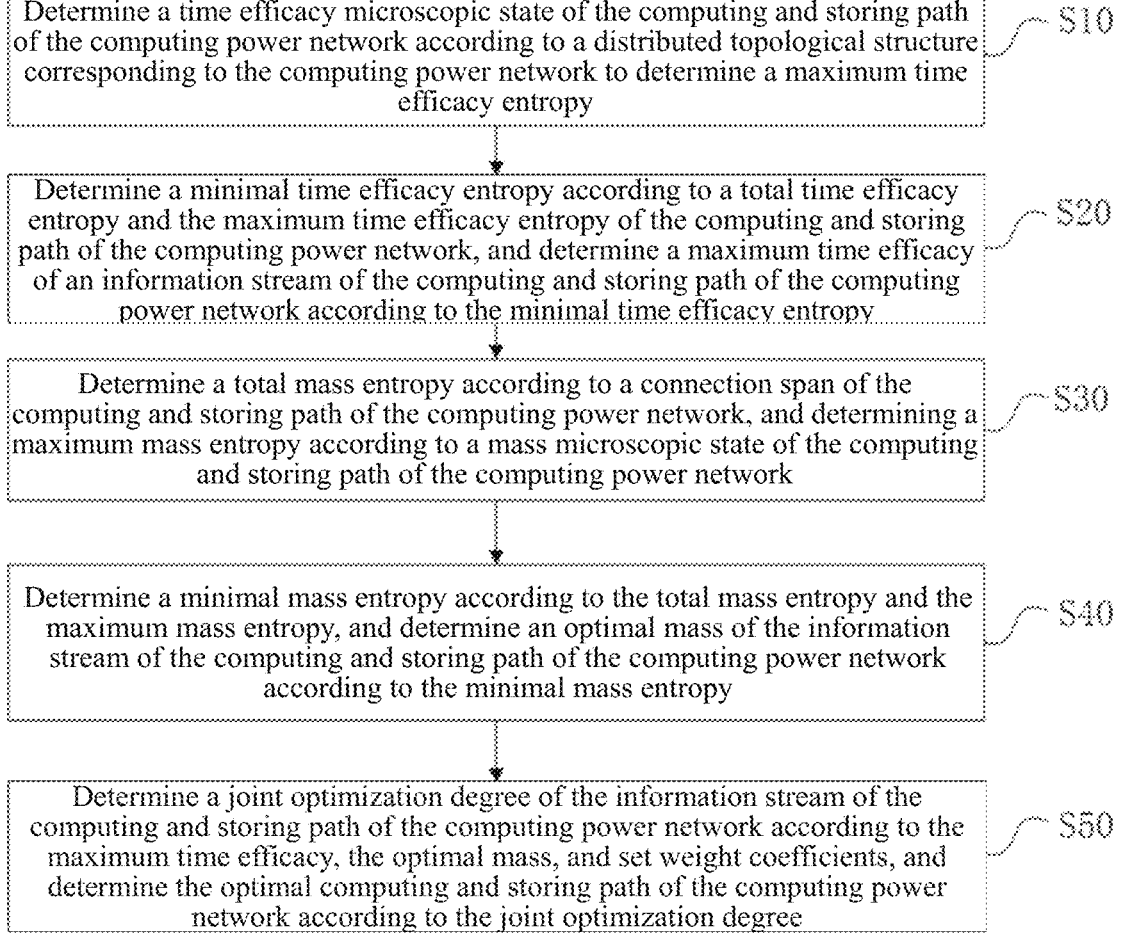

Determine a time efficacy microscopic state of the computing and storing path of the computing power network according to a distributed topological structure corresponding to the computing power network to determine a maximum time efficacy entropy — S10

Determine a minimal time efficacy entropy according to a total time efficacy entropy and the maximum time efficacy entropy of the computing and storing path of the computing power network, and determine a maximum time efficacy of an information stream of the computing and storing path of the computing power network according to the minimal time efficacy entropy — S20

Determine a total mass entropy according to a connection span of the computing and storing path of the computing power network, and determining a maximum mass entropy according to a mass microscopic state of the computing and storing path of the computing power network — S30

Determine a minimal mass entropy according to the total mass entropy and the maximum mass entropy, and determine an optimal mass of the information stream of the computing and storing path of the computing power network according to the minimal mass entropy — S40

Determine a joint optimization degree of the information stream of the computing and storing path of the computing power network according to the maximum time efficacy, the optimal mass, and set weight coefficients, and determine the optimal computing and storing path of the computing power network according to the joint optimization degree — S50

FIG. 1

METHOD FOR DETERMINING OPTIMAL COMPUTING AND STORING PATH OF COMPUTING POWER NETWORK AND MONITORING APPARATUS

CROSS-REFERENCE TO RELATED APPLICATIONS

The present application is a continuation of International Application No. PCT/CN2022/119812, with an international filing date of Sep. 20, 2022, which is based upon and claims priority to Chinese Patent Application No. 202210594750.0, filed on May 27, 2022, the entire contents of all of which are incorporated herein by reference.

TECHNICAL FIELD

The present disclosure relates to the technical field of computers, and in particularly relates to a method for determining an optimal computing and storing path of a computing power network and a monitoring apparatus.

BACKGROUND

A computing power network is a large-scale system formed by a plurality of layers (including a service ability open layer, an arranging and scheduling ability layer, and a resource scheduling management layer), a plurality of complex networks (a virtualized area network, an integrated management area network, and a core network area). Therefore, the computing and storing resource distributing and scheduling problem of the computing power network is a preferential problem of the optimal path of information transmission in a complex activity network in an uncertain condition.

At present, because a typical computer has been difficult to meet a requirement on exponential surge of computing power, and a novel quantum computing power network has been established in an architecture mode where a typical computer and a quantum computer are organically combined to solve the problems of various computing power requirement styles, limited computing power resources and the like, which is the requirement on establishment of a quantum computing power network. In a distributed topological structure of the computing power network formed by a plurality of complex networks, optimization of the optimal path of computing and storing information transmission of the computing power network is the problem that has to be settled urgently to enhance the computing and storing capacities of the computing power network.

SUMMARY

The present disclosure provides a method for determining an optimal computing and storing path of a computing power network and a monitoring apparatus to solve the problem of how to determine the optimal path of computing and storing information transmission of the computing power network. The method includes: determining a maximum time efficacy and an optimal mass, and set weight coefficients of the computing power network computing and storing the path based on a distributed topological structure corresponding to the computing power network, determining a joint optimization degree, and then determining the optimal computing and storing path of the computing power network according to the joint optimization degree.

The present disclosure provides a method for determining an optimal computing and storing path of a computing power network, including:

determining a time efficacy microscopic state of a computing and storing path of the computing power network according to a distributed topological structure corresponding to the computing power network to determine a maximum time efficacy entropy;

determining a minimal time efficacy entropy according to a total time efficacy entropy and the maximum time efficacy entropy of the computing and storing path of the computing power network, and determining a maximum time efficacy of an information stream of the computing and storing path of the computing power network according to the minimal time efficacy entropy;

determining a total mass entropy according to a connection span of the computing and storing path of the computing power network, and determining a maximum mass entropy according to a mass microscopic state of the computing and storing path of the computing power network;

determining a minimal mass entropy according to the total mass entropy and the maximum mass entropy, and determining an optimal mass of the information stream of the computing and storing path of the computing power network according to the minimal mass entropy; and determining a joint optimization degree of the information stream of the computing and storing path of the computing power network according to the maximum time efficacy, the optimal mass, and set weight coefficients, and determining an optimal computing and storing path of the computing power network according to the joint optimization degree.

In an embodiment, before the determining a time efficacy microscopic state of the computing and storing path of the computing power network according to a distributed topological structure corresponding to the computing power network to determine a maximum time efficacy entropy, the method further includes:

determining the time efficacy microscopic state according to the connection span and a connection quantity of the computing and storing path of the computing power network; and determining the total time efficacy entropy according to the time efficacy microscopic state.

In an embodiment, the determining a maximum mass entropy according to the mass microscopic state of the computing and storing path of the computing power network includes:

determining a realization probability value of the mass microscopic state according to the mass microscopic state of the computing and storing path of the computing power network; and determining the maximum mass entropy according to the realization probability value of the mass microscopic state.

The present disclosure further provides a monitoring apparatus, including:

a dynamic data management module, configured to record, store or call data;

a path parameter recording module, configured to record and store a feature information value and a quantity value of the computing and storing path of the computing power network;

a preferred path pre-judging module, configured to pre-judge a type of the computing and storing path of the computing power network;

a preferred path parsing module, configured to parse data of the computing and storing path of the computing power network;

a preferred path computing module, configured to compute the maximum time efficacy, the optimal mass, and the joint optimization degree of the computing and storing path of the computing power network;

a preferred result storage module, configured to store a single index computed value and a comprehensive computed value of the computing and storing path of the computing power network; and a display monitoring intervention module, configured to display a data feature of the computing and storing path of the computing power network.

In an embodiment, the dynamic data management module includes:

a user layer, configured to select and schedule the data of the computing and storing path of the computing power network and to perform data interaction with a data layer; and an application server layer, arranged between the user layer and the data layer and configured to manage the data;

where the data layer is configured to store or call the data.

In an embodiment, the preferred path pre-judging module includes a plurality of pre-judging modules that are configured to pre-judge the type of the computing and storing path of the computing power network.

In an embodiment, the preferred path parsing module includes a plurality of parsing modules that are configured to parse initial state data, intermediate operational data, analysis process data, and itemized operational data of the computing and storing path of the computing power network; and the parsing modules are further configured to parse the weight coefficient of the maximum time efficacy and the weight coefficient of the optimal mass in the joint optimization degree of the computing and storing path of the computing power network.

In an embodiment, the preferred path computing module includes a plurality of computing modules that are configured to compute the maximum time efficacy, the optimal mass, and the joint optimization degree according to the data of the parsing modules.

In an embodiment, the preferred path storage module includes a plurality of storage modules, configured to store the itemized computing process data of the maximum time efficacy of the computing and storing path of the computing power network and the maximum time efficacy; and the storage modules are further configured to store the itemized computing process data of the optimal mass of the computing and storing path of the computing power network and the optimal mass; and the storage modules are further configured to store the weight coefficient of the maximum time efficacy, the weight coefficient of the optimal mass, and the computed value of the joint optimization degree of the computing and storing path of the computing power network.

In an embodiment, the display monitoring intervention module includes:

a process display module, configured to display initial state data and intermediate operational process data of the computing and storing path of the computing power network;

an intervention display module, configured to display adjustment data of related parameters participating in a preferred operation process, the weight coefficient of the maximum time efficacy, and the weight coefficient of the optimal mass of the computing and storing path of the computing power network; and a result display module, configured to display the maximum time efficiency and an itemized computed value of the maximum time efficacy, the optimal mass and an itemized computed value of the optimal mass, and the joint optimization degree.

According to the method for determining an optimal computing and storing path of a computing power network and a monitoring apparatus, the method includes: determining the maximum time efficacy entropy of the computing and storing path of the computing power network according to the distributed topological structure corresponding to the computing power network; determining the minimal time efficacy entropy according to the total time efficacy entropy and the maximum time efficacy entropy of the computing and storing path of the computing power network, and determining the maximum time efficacy of the information stream of the computing and storing path of the computing power network according to the minimal time efficacy entropy; determining the total mass entropy according to the connection span of the computing and storing path of the computing power network, and determining the maximum mass entropy according to the mass microscopic state of the computing and storing path of the computing power network; determining the minimal mass entropy according to the total mass entropy and the maximum mass entropy, and determining the optimal mass of the information stream of the computing and storing path of the computing power network according to the minimal mass entropy; and determining the joint optimization degree of the information stream of the computing and storing path of the computing power network according to the maximum time efficacy, the optimal mass, and a set weight coefficient, and determining the optimal computing and storing path of the computing power network according to the joint optimization degree. On this basis, in a distributed topological structure of the computing power network formed by a plurality of complex networks, the optimal path of computing and storing information transmission of the computing power network is dynamically optimized, so that the computing and storing capacities of the computing power network and the time validity, accuracy, and reliability of a computing and storing process of the computing power network are enhanced.

BRIEF DESCRIPTION OF THE DRAWINGS

In order to describe the technical solutions of the present disclosure or the prior art more clearly, drawings needed to be used in the embodiments or the prior art will be briefly described below. It is apparent that the drawings described below are some embodiments of the present disclosure, and those skilled in the technical field further can obtain other drawings according to the drawings without making creative efforts.

FIG. 1 is a schematic diagram of a flow of a method for determining an optimal computing and storing path of a computing power network provided by the present disclosure;

DESCRIPTION OF THE EMBODIMENTS

In order to make the objectives, technical solutions and advantages of the present disclosure clearer, the technical solutions in the present disclosure will be clearly and completely described below in conjunction with the drawings in the present disclosure, and apparently, the described embodiments are some examples rather than all embodiments of the present disclosure. On the basis of the embodiments in the present disclosure, all other embodiments obtained by those of ordinary skill in the art without making creative efforts fall into the scope of protection of the present disclosure.

The method for determining an optimal computing and storing path of a computing power network and the monitoring apparatus provided by the present disclosure will be described below in conjunction with FIGS. 1-7.

Specifically, the present disclosure provides a method for determining an optimal computing and storing path of a computing power network. Referring to FIG. 1, FIG. 1 is a schematic diagram of a flow of a method for determining an optimal computing and storing path of a computing power network provided by the present disclosure.

The method for determining an optimal computing and storing path of a computing power network provided in an embodiment of the present disclosure includes:

S10: a time efficacy microscopic state of a computing and storing path of a computing power network is determined according to a distributed topological structure corresponding to the computing power network to determine a maximum time efficacy entropy;

it is to be noted that in the process of transmitting the computing and storing information of the computing power network, information circulation has uncertainty in terms of speed, resulting in a time fluctuation of efficiency of information circulation. The amplitude of uncertainty describing the selecting time efficacy of the computing and storing path of the computing power network is represented by the "time efficacy entropy", and the maximum time efficacy of the information transmission path of the computing power network is represented by the "maximum time efficacy of the information stream".

Figure 3:
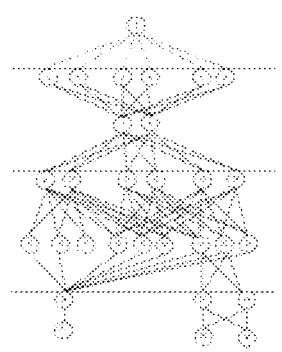
FIG. 3 is a schematic diagram of a distributed topological structure of a strategy set of a computing and storing path network of the computing power network provided by the present disclosure.

About the Strategy Set of the Computing and Storing Path of the Computing Power Network:

The strategy set of the computing and storing path of the computing power network refers to a set of information transmission path solutions formed by the topological structure relying on an activity network of the computing power network. For example, reference in FIG. 3 is made to the distributed topological structural diagram of the computing and storing path network set of the computing power network.

About the Computing and Storing Path Network of the Computing Power Network:

In the strategy set of the computing and storing path of the computing power network, any one computing and storing path network constructed relying on a relationship between layers of the distributed topological structure corresponding to the computing power network is called the computing and storing path network of the computing power network, where each node represents the layer where the computing power network is located; there is an access traffic with an initial value of 0 at each node; and in a case that the node is accessed (i.e., with an arrow shaft joint), the access value of the accessed node is added with 1.

Figure 4:
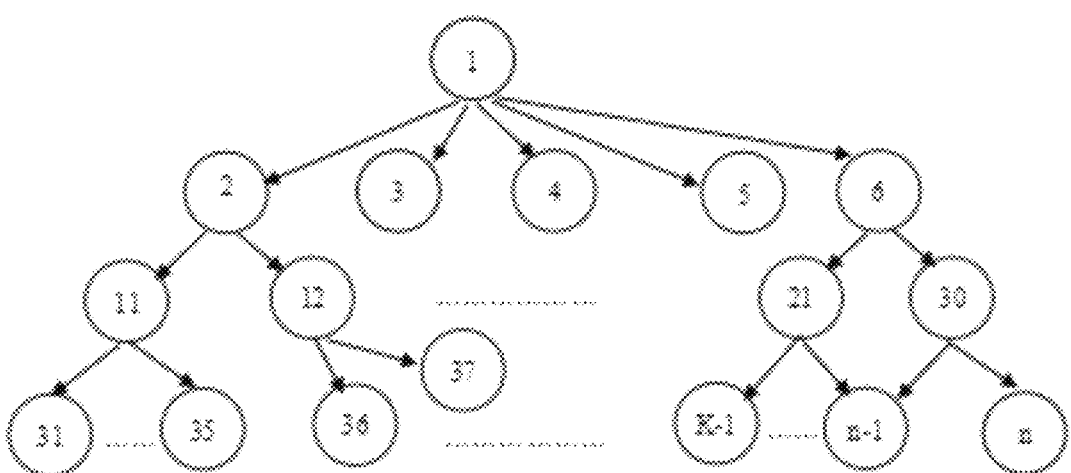
FIG. 4 is a schematic diagram of a centralized topological structure of the computing and storing path network provided by the present disclosure.
Figure 5:
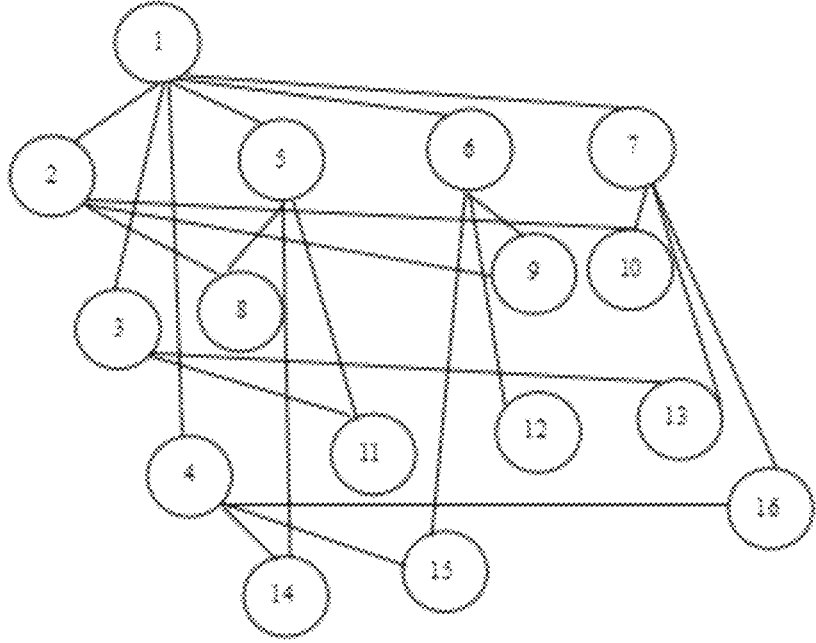
FIG. 5 is a schematic diagram of a matrix type topological structure of the computing and storing path network provided by the present disclosure.

It is to be noted that any one path network in the strategy set of the computing and storing paths of the distributed topological structure corresponding to the computing power network is called the computing and storing path of the computing power network for short (a certain path network, for example, the centralized topological structural diagram of the computing and storing path network set of the computing power network with reference to FIG. 4 and the matrix type topological structural diagram of the computing and storing path network of the computing power network with reference to FIG. 5).

It is described by the computing and storing path of the computing power network, that is, in the computing and storing path of the computing power network, in a case that the information stream passes through the node once, the throughput is 1, the length of the direct joint is 1, too, and the length of the joint is added with 1 once being transferred; and in a case that the information stream passes through the node n times, the throughput is n.

About Node Span:

In the computing and storing path of the computing power network, the information stream is defined by the throughput of the node as the node span, and the maximum values of all the node spans are defined as the span of the computing and storing path of the computing power network.

In a case that there are totally n cuts in the computing and storing path of a certain computer power network, the throughput of the information stream passing through the $i^{th}$ node is $k_i$, then the node span is $k_i$; $\forall i$, $k_i$; n, $maxk_i=N$ (i=1, 2, ..., n), the span of the computing and storing path of the computing power network is N.

For example, as shown in FIG. 3, the span of the node 1 is 5; the maximum span of the node 1 is (n−31); the maximum span of the computing and storing path of the computing power network is the maximum span of the node 1, that is, the maximum span of the computing and storing path of the computing power network shown in FIG. 3 is (n−31).

About the Time Efficacy of the Information Stream:

In the computing and storing path of the computing power network, a measure for measuring the amplitude of rapidity of circulation of the information stream in the transfer process is defined as the time efficacy of the information stream.

About the Connection Degree of the Cut:

In the computing and storing path of the computing power network, the total flow of the shortest path among the nodes of the cut is defined as the connection degree of the cut.

It can be described as follows: in the computing and storing path of the computing power network, the connection degree of the $j^{th}$ cut in the $i^{th}$ subnetwork is labeled as $I_{ij}$. Computing of the $I_{ij}$ is determined by the shortest path of the total flow of a branch among the cut nodes, the length of the direct joint is 1, and the length of the joint is added with 1 once being transferred.

The quantity of the joint lengths directly connected to the node i is defined as a connection span $k_i$, where $k_i$ is a natural number. For example, the connection span $k_i=1$ indicates that the node is only accessed once, that is, there is only one node with the length of the direct joint being 1.

About the Traversed Microscopic States of the System:

In case that the system is inspected from a certain angle, the system may represent all experienced microscopic states which are defined as the traversed microscopic states of the system.

About the Total Quantity of the Microscopic States:

The total quantity of the microscopic states of the state refers to the total quantity of the microscopic states with the quantity of the microscopic states in a probably path called states in a case that the system is evolved into a certain state.

About the Time Efficacy Microscopic State:

The quantity of spans $k_i$ of the $i^{th}$ node in the $j^{th}$ cut is called a connection quantity, labeled as $$l_{ij}^T,$$

which corresponds to a natural number set. The microscopic state of the computing and storing path of the computing power network is labeled as $$L_{ij}^{Tk_i},$$

and defined as follows:

$$L_{ij}^{Tk_i} = k_i l_{ij}^T, \tag{1}$$

where $$l_{ij}^T$$

is the connection quantity corresponding to the $j^{th}$ cut in case of the span $k_i$.

For example, the connection span $k_i=1$ indicates that the length of the direct joint is 1, $k_i=2$ indicates that there are 2 nodes with the length of the direct joint being 1, that is the span is 2, and so forth.

In the computing and storing path of the computing power network, there is 1 subnetworks; the $i^{th}$ subnetwork has j cuts; the time efficacy microscopic state of the information stream is $$L_{ij}^{Tk_i},$$

and then the total time efficacy connection degree is labeled as $A^T$, and defined as follows:

$$A^T = \sum_{i=1}^{l} \left( \sum_{k_i} \sum_j L_{ij}^{TK_i} \right) \tag{2}$$

About the Time Efficacy Entropy:

In the computing and storing path of the computing power network, the measure of the amplitude of the time efficacy uncertainty of the information stream passing through the "network" is called the time efficacy entropy of the computing and storing path of the computing power network, labeled as, $$E_{ij}^{Tk_i},$$

and defined as follows:

$$E_{ij}^{TK_i} = -p_{ij}^{k_i} \ln p_{ij}^{k_i} \tag{3}$$

where $$p_{ij}^{k_i}$$

is a realization probability in a case that the nodes with the connection span being $k_i$ at the $j^{th}$ cut in the $i^{th}$ subnetwork connect.

In the computing and storing path network of the computing power network, there are l subnetworks, a probability $$p_{ij}^{k_i}$$

defined as follows:

$$p_{ij}^{k_i} = L_{ij}^{Tk_i} / \sum_{i=1}^{l} \left( \sum_{k_i} \sum_j L_{ij}^{Tk_i} \right) = k_i l_{ij}^T / \sum_{i=1}^{l} \left( \sum_{k_i} \sum_j \sum_j k_i l_{ij}^{Tk_i} \right) \tag{4}$$

About the Total Time Efficacy Entropy:

In the computing and storing path of the computing power network, there is subnetworks, and the total time efficacy entropy is labeled as $$E_Z^T$$

and defined as follows:

$$E_Z^T = \sum_i^l \sum_{k_i} \sum_{j=1}^m E_{ij}^{Tk_i} \tag{5}$$

where $k_i$ is the connection quantity of the $i^{th}$ subnetwork, and m is the quantity of the cuts in the computing and storing path of the computing power network.

About the Maximum Time Efficacy Entropy:

In the computing and storing path of the computing power network, there are l subnetworks, the time efficacy microscopic state is labeled as $$L_{ij}^{Tk_i},$$

the maximum connection degree is labeled as $A_{max}$, and the maximum time efficacy entropy of the computing and storing path of the computing power network is labeled as $$E_{max}^T$$

and defined as follows:
where $$E_{max}^T = \ln A_{max} \tag{6}$$

$$A_{max} = A^T = \sum_{i=1}^{l}\left(\sum_{k_i}\sum_{j=1}^{m}L_{ij}^{Tk_i}\right) \tag{7}$$

A measure of the maximum time efficacy entropy of the computing and storing path of the computing power network in the microscopic state $$L_{ij}^{Tk_i}$$

is:

$$E_{max}^T = \ln A_{max} = \ln\left[\sum_{i=1}^{l}\left(\sum_{k_i}\sum_{j=1}^{m}L_{ij}^{Tk_i}\right)\right] \tag{8}$$

S20: a minimal time efficacy entropy is determined according to a total time efficacy entropy and the maximum time efficacy entropy of the computing and storing path of the computing power network, and a maximum time efficacy of an information stream of the computing and storing path of the computing power network is determined according to the minimal time efficacy entropy;

It is to be noted that in the computing and storing path of the computing power network, there are l subnetworks, the total time efficacy entropy is $$E_Z^T,$$

the maximum time efficacy entropy is $$E_{max}^T,$$

and the minimal time efficacy entropy of the computing and storing path of the computing power network is labeled as $$E_{min}^T$$

and defined as follows:

$$E_{min}^T = E_Z^T / E_{max}^T \tag{9}$$

About the Maximum Time Efficacy of the Information Stream:

In the strategy space of the computing and storing path of the computing power network, the maximum time efficacy of the information stream of a certain path is labeled as $$R_{max}^T$$

and defined as follows:

$$R_{max}^T = 1 - \left(E_Z^T / E_{max}^T\right)\left(R_{max}^T \in [0, 1]\right) \tag{10}$$

A measured value is quantified by taking the maximum time efficacy of the information stream is taken as the maximum time efficacy $$R_{max}^T$$

of the topological structure of the computing and storing path of the computing power network. That is, the greater the maximum time efficacy value $$R_{max}^T$$

is, the more optimized the computing and storing path of the computing power network represented is, vice versa.

S30: a total mass entropy is determined according to a connection span of the computing and storing path of the computing power network, and a maximum mass entropy is determined according to a mass microscopic state of the computing and storing path of the computing power network;

it is to be noted that in the process of transmitting the computing and storing information of the computing power network, there is an uncertainty of mistakes in the information stream transfer process, resulting in a fluctuation of information mass. The amplitude of mass uncertainty describing the selecting the computing and storing path of the computing power network is represented by the "mass entropy", and the optimal mass of the information transmission path of the computing power network is represented by the "maximum mass of the information stream".

About the Mass of the Information Stream:

In the computing and storing path of the computing power network, a measure for measuring the amplitude of accuracy of circulation of the information stream in the transfer process is defined as the mass of the information stream.

About the Mass Microscopic State:

In the computing and storing path network of the computing power network, there are l subnetworks, the total quantity of the mass microscopic states of the $j^{th}$ cut with the connection span being $k_i$ in the $i^{th}$ subnetwork is labeled as $$L_{ij}^{Mk_i}$$

and defined as follows:

$$L_{ij}^{Mk_i} = \sum_j \sum_i k_i (i = 1, 2, \dots, l, j = 1, 2, m) \tag{11}$$

where $k_i$ is the connection span of the $i^{th}$ node.

In the computing and storing path network of the computing power network, there are l subnetworks, the realization probability value of the mass microscopic states of the $j^{th}$ cut with the connection span being $k_i$ in the $i^{th}$ subnetwork is labeled as $$p_{ij}^{Mk_i}$$

and defined as follows:

$$p_{ij}^{Mk_i} = \frac{k_i}{L_{ij}^{Mk_i}} = k_i / \sum_j \sum_i k_i (i = 1, 2, \dots, l, j = 1, 2, m) \tag{12}$$

About the Mass Entropy:

the measure of the amplitude of the mass uncertainty of the information stream passing through the computing and storing "path network" of the computing power network is called the mass entropy of the computing and storing path of the computing power network, labeled as $$E_{ij}^{Mk_i},$$

and defined as follows:

$$E_{ij}^{Mk_i} = -p_{ij}^{Mk_i} \ln p_{ij}^{Mk_i} (i = 1, 2, \dots, l, j = 1, 2, \dots m) \tag{13}$$

the equation (12) is substituted into the equation (13) to obtain:

$$E_{ij}^{Mk_i} = -\frac{k_i}{L_{ij}^{Mk_i}} \ln \frac{k_i}{L_{ij}^{Mk_i}} = -\left(k_i / \sum_j \sum_i k_i\right) \ln\left(k_i / \sum_j \sum_i k_i\right),$$

$$(i = 1, 2, \dots, l, j = 1, 2, \dots m);$$

About the Total Mass Entropy:

In the computing and storing path network of the computing power network, there are l subnetworks, the total mass entropy of the system of the $j^{th}$ cut with the connection span being $k_i$ in the $i^{th}$ subnetwork is labeled as $$E_Z^M$$

and defined as follows:

$$E_Z^M = \sum_i^l \sum_{k_i} \sum_{j=1}^m E_{ij}^{Mk_i} \tag{14}$$

In the computing and storing path network of the computing power network, there are l subnetworks, the mass microscopic state of the $j^{th}$ cut with the connection span being $k_i$ in the $i^{th}$ subnetwork is labeled as $$L_{ij}^{k_i},$$

and the maximum mass entropy of the computing and storing path of the computing power network is labeled as $$E_{max}^M$$

and defined as follows:

$$E_{max}^M = -\sum_{j=1}^m \sum_{i=1}^l \sum_{k_i}^{k_i} \ln p_{ij}^{Mk_i} \tag{15}$$

S40: a minimal mass entropy is determined according to the total mass entropy and the maximum mass entropy, and an optimal mass of the information stream of the computing and storing path of the computing power network is determined according to the minimal mass entropy;

It is to be noted that in the computing and storing path of the computing power network, there are I subnetworks, the total mass efficacy entropy is labeled as $$E_Z^M,$$

the maximum mass efficacy entropy is $$E_{max}^T,$$

and the minimal mass efficacy entropy of the computing and storing path of the computing power network is labeled as $$E_{min}^M$$

and defined as follows:

$$E_{min}^M = E_Z^M / E_{max}^M \tag{16}$$

About the Optimal Mass of the Information Stream:

The optimal mass of the information stream of the computing and storing path of the computing power network is labeled as $$R_{max}^M$$

and defined as follows:

$$R_{max}^M = 1 - \left(E_Z^M / E_{max}^M\right) \tag{17}$$

A measured value is quantified by taking the optimal mass of the information stream is taken as the maximum mass $$R_{max}^M$$

of the topological structure of the computing and storing path of the computing power network. That is, the greater the maximum mass value $$R_{max}^M$$

is, the more optimized the computing and storing path of the computing power network represented is, vice versa.

S50: a joint optimization degree of the information stream of the computing and storing path of the computing power network IS determined according to the maximum time efficacy, the optimal mass, and set weight coefficients, and determine the optimal computing and storing path of the computing power network according to the joint optimization degree.

It is to be noted that in the process of transmitting the computing and storing information of the computing power network, the speed of information circulation has uncertainty, resulting in fluctuation of information flowing efficiency. In the process of transferring the information stream, the chance of mistakes has uncertainty, resulting in good or bad information quality. In a case that the optimal path selection is computed and stored, the time efficacy is emphasized and the accuracy is also considered. Therefore, the definition of the joint optimization degree of the computing and storing path of the computing power network is introduced in the embodiment of the present disclosure.

About the Joint Optimization Degree:

In the strategy space of the computing and storing path of the computing power network, the maximum time efficacy of the information stream in a certain path is labeled as $$R_{max}^T,$$

the optimal mass of the information stream is labeled as $$R_{max}^M,$$

and the condition for the selecting standard of the optimal path is as follows: the maximum time efficacy is required, and the measure of the optimal mass is defined as the joint optimization degree of the information stream, represented by $$R_{max}^{AD}$$

and defined as follows:

$$R_{max}^{AD} = \alpha_1 R_{max}^T + \alpha_2 R_{max}^M \tag{18}$$

where $\alpha_1 \geq 0$, $\alpha_2 \geq 0$, $\alpha_1 + \alpha_2 = 1_{\circ}$,
that is, the greater the joint optimization degree $$R_{max}^{AD}$$

is, the more optimized the computing and storing path of the computing power network represented is, vice versa.

In a specific embodiment, two computing and storing paths of the computing power network are selected based on an overall flow of smart optimal scheduling work of the computing and storing path of the computing power network:

Path 1: a matrix type topological structure of the network (referring to FIG. 5)

Figure 6:
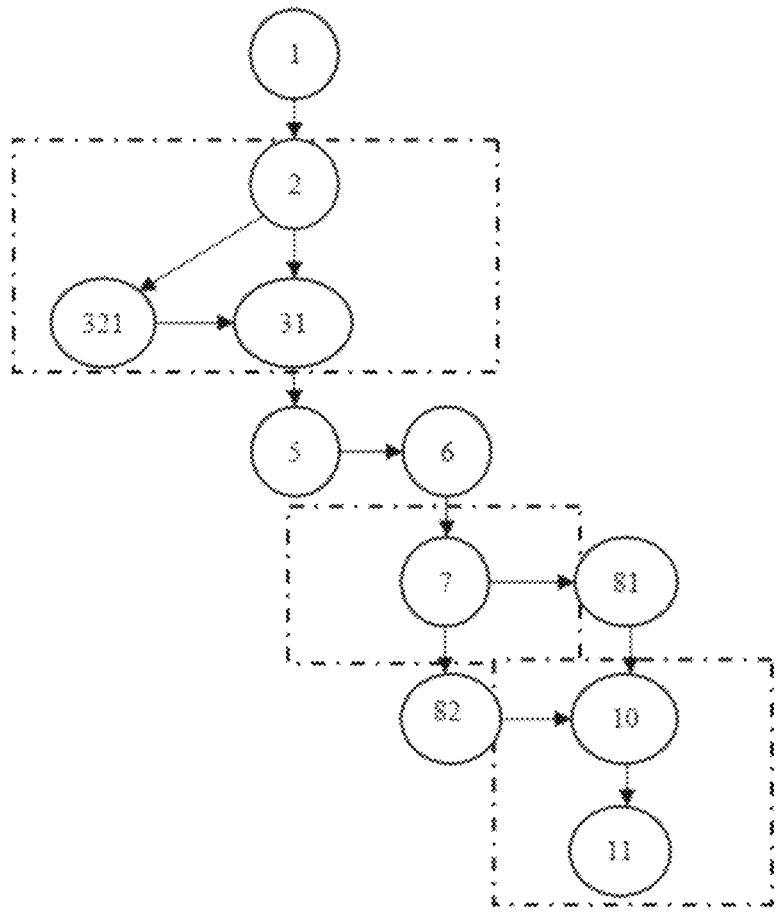
FIG. 6 is a schematic diagram of a distributed topological structure of the computing and storing path network of the computing power network provided by the present disclosure.
Figure 7:
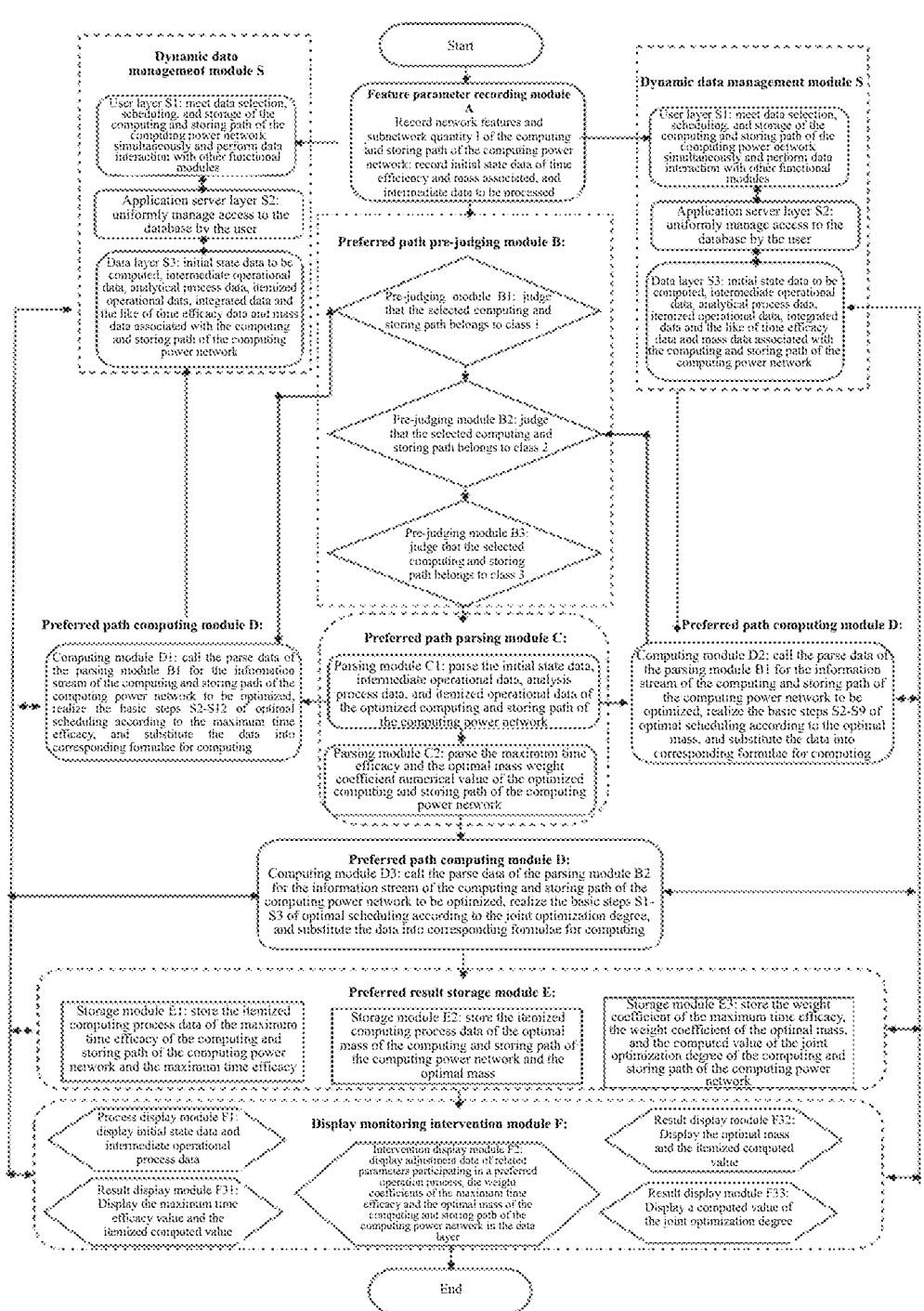
FIG. 7 is a work flowchart of a system of a monitoring apparatus based on the method for determining an optimal computing and storing path of a computing power network provided by the present disclosure.

Path 2: a distributed topological structure of the network (referring to FIG. 6)

The optimal masses (shown in table 1) and the maximum time efficacies (shown in table 2) of the corresponding topological structures of the network are computed respectively.

TABLE 1

| Optimal mass of the matrix type topological structure of the computing and storing path network of the computing power network | | | | | | |
|---|---|---|---|---|---|---|
| | | Parameter measured value | | | | |
| Parameter name | Applied formula | k = 1 | k = 2 | k = 3 | k = 4 | k = 5 |
| Connection span | k | 1 | 8 | 1 | 5 | 1 |
| Microscopic state | $L_j^{Mk} = \sum_j k$ | | | 16 | | |
| Probability | $p_j^{Mk} = \dfrac{k}{L_j^{Mk}} = k / \sum_j k$ | 0.0625 | 0.5 | 0.0625 | 0.3125 | 0.0625 |
| Quality entropy | $E_j^{Mk} = -p_j^{Mk} \ln p_j^{Mk}$ | 0.1733 | 0.3466 | 0.1733 | 0.3635 | 0.1733 |

TABLE 1-continued

Optimal mass of the matrix type topological structure of the computing and storing
path network of the computing power network

| Parameter name | Applied formula | Parameter measured value | | | | |
| --- | --- | --- | --- | --- | --- | --- |
| | | k = 1 | k = 2 | k = 3 | k = 4 | k = 5 |
| Total mass entropy | $E_Z^M = \sum_k \sum_{j=1}^m E_j^{Mk}$ | | | 1.23 | | |
| Maximum mass entropy | $E_{max}^M = -\sum_{j=1}^m \sum_k \ln p_i^{Mk}$ | | | 10.1742 | | |
| Minimal mass entropy | $E_{min}^M = E_Z^M / E_{max}^M$ | | | 0.1209 | | |
| Optimal mass | $R_{max}^M = 1 - \left(E_Z^M / E_{max}^M\right)$ | | | 0.8791 | | |

TABLE 2

Maximum time efficacy of the distributed topological structure of the computing and
storing path network of the computing power network

| Parameter name | Applied formula | Parameter measured value | | |
| --- | --- | --- | --- | --- |
| | | k = 1 | k = 2 | k = 3 |
| Connection degree Microscopic state | $l_{ij}$　　$L_{ij}{}^k = k_i l_{ij}$ | 12　12 | 12　24 | 4　12 |
| Probability | $p_{ij}^k = L_{ij}^k / \Sigma_k \Sigma_j L_{ij}^k$ | 12/48 = 0.25 | 24/48 = 0.5 | 12/48 = 0.25 |
| Time efficacy entropy | $E_{ij}^k = -p_{ij}^k \ln p_{ij}^k$ | 0.3466 | 0.3466 | 0.3466 |
| Maximum connection degree | $A_{max} \triangleq \Sigma_i^n \left(\sum_{k=1}^{} \sum_{j=1}^m L_{ij}^k\right)$ | | 48 | |
| Maximum time efficacy entropy | $E_{max}^T = \ln A_{max}$ | | 3.871 | |
| Minimal time efficacy entropy | $E_{min}^T = E_Z^T / E_{max}^T$ | | 0.9105 | |
| Maximum time efficacy | $R^t = 1 - \left(\Sigma_1^k E_{ij}^k / E_{max}^t\right)$ | | 0.7314 | |

The method for determining an optimal computing and storing path of a computing power network provided by the embodiment of the present disclosure includes: determining the maximum time efficacy entropy of the computing and storing path of the computing power network according to the distributed topological structure corresponding to the computing power network; determining the minimal time efficacy entropy according to the total time efficacy entropy and the maximum time efficacy entropy of the computing and storing path of the computing power network, and determining the maximum time efficacy of the information stream of the computing and storing path of the computing power network according to the minimal time efficacy entropy; determining the total mass entropy according to the connection span of the computing and storing path of the computing power network, and determining the maximum mass entropy according to the mass microscopic state of the computing and storing path of the computing power network; determining the minimal mass entropy according to the total mass entropy and the maximum mass entropy, and determining the optimal mass of the information stream of the computing and storing path of the computing power network according to the minimal mass entropy; and determining the joint optimization degree of the information stream of the computing and storing path of the computing power network according to the maximum time efficacy, the optimal mass, and a set weight coefficient, and determining the optimal computing and storing path of the computing power network according to the joint optimization degree. On this basis, in a distributed topological structure of the computing power network formed by a plurality of complex networks, the optimal path of computing and storing information transmission of the computing power network is dynamically optimized, so that the computing and storing capacities of the computing power network and the time validity, accuracy, and reliability of a computing and storing process of the computing power network are enhanced.

It is to be noted that because a typical computer has been difficult to meet a requirement on exponential surge of computing power, and a novel quantum computing power network has been established in an architecture mode where a typical computer and a quantum computer are organically combined to solve the problems of various computing power requirement styles, limited computing power resources and the like, which is the requirement on establishment of a quantum computing power network.

The embodiment of the present disclosure gives a minimal entropy method for determining the optimal computing and storing path of the computing power network by optimizing the strategy of the optimal path from the strategy set of the computing and storing paths of the computing power network, including:

started from the time efficiency of the information stream, giving a minimal entropy model and an algorithm for determining the maximum time efficacy of the computing and storing path of the computing power network based on the path of the optimally scheduled information stream in different complex network paths;

started from the accuracy of the information stream, giving a minimal entropy model and an algorithm for determining the optimal mass of the computing and storing path of the computing power network based on the path of the optimally scheduled information stream in different complex network paths;

started from both the time efficacy and accuracy of the information stream, giving a method for determining the joint optimization degree of the computing and storing path of the computing power network to realize optimal scheduling of resources in the computing and storing path of the computing power network in a dynamic network; and moreover, designing the maximum time efficacy, the optimal mass, and the optimal path of the computing and storing path of the computing power network to realize a basic flow of optimal scheduling.

Specifically, the optimal scheduling is realized according to the maximum time efficacy of the computing and storing path of the computing power network, with the basic flow including:

S1: recording network features (the total quantity 1 of the subnetworks, the cuts j, the nodes i, and the span $k_i$) of each path of the distributed topological structure path set (or an active network structure) corresponding to the computing and storing path of the computing power network, and storing the network features in the dynamic data management module;

S2: computing the quantity $k_i$ of the spans of the node in the cut of the $i^{th}$ node in the $j^{th}$ cut, and storing the quantity in the preferred path parsing module;

S3: computing the connection quantity $$l_{ij}^T$$

of the $i^{th}$ node with the span being $k_i$ in the $j^{th}$ cut, and storing the connection quantity in the preferred path parsing module;

S4: computing the time efficacy microscopic state $$L_{ij}^{Tk_i}$$

of the $i^{th}$ node with the span being $k_i$ in the $j^{th}$ cut, and storing the microscopic state in the preferred path parsing module;

S5: computing the total connection degree $A^T$ of the time efficacy of the $i^{th}$ node with the span being $k_i$ in the $j^{th}$ cut, and storing the total connection degree in the preferred path parsing module;

S6: computing the realization probability $$p_{ij}^{k_i}$$

of the $j^{th}$ cut with the connection quantity being $k_i$ in the $i^{th}$ subnetwork during connection among the nodes, and storing the probability in the preferred path parsing module;

S7: computing the time efficacy entropy $$E_{ij}^{Tk_i}$$

of the $i^{th}$ node with the probability being $$p_{ij}^{k_i}$$

in the $j^{th}$ cut, and storing the time efficacy entropy in the preferred path parsing module;

S8: computing the total time efficacy entropy $$E_Z^T$$

of the $l^{th}$ subnetwork, and storing the total time efficacy entropy in the preferred path parsing module;

S9: computing the maximum connection degree $A_{max}$ in the $l^{th}$ subnetwork with the time efficacy microscopic state being $$L_{ij}^{Tk_i},$$

and storing the maximum connection degree in the preferred path parsing module;

S10: computing the maximum time efficacy entropy $$E_{max}^T$$

of the $l^{th}$ subnetwork, and storing the maximum time efficacy entropy in the preferred path parsing module;

S11: computing the minimal time efficacy entropy $$E_{min}^T$$

of the $l^{th}$ subnetwork, and storing the minimal time efficacy entropy in the preferred path parsing module; and S12: computing the maximum time efficacy $$R_{max}^T$$

of the information stream through the $l^{th}$ subnetwork on the path, and storing the maximum time efficacy in the preferred result storage module.

The optimal scheduling is realized according to the maximum mass of the computing and storing path of the computing power network, with the basic flow including:

S1: recording the total path network features of the distributed topological structure path set (or an active network structure) corresponding to the computing and storing path of the computing power network, and storing the network features in the dynamic data management module;

S2: computing the span $k_i$ of the $i^{th}$ subnetwork, and storing the span in the preferred path parsing module;

S3: computing the total quantity $$L_{ij}^{Mk_i}$$

of the microscopic states of the $j^{th}$ cut with the span being $k_i$ in the $i^{th}$ subnetwork, and storing the total quantity in the preferred path parsing module;

S4: computing the realization probability $$p_{ij}^{Mk_i}$$

total quantity of the mass microscopic state of the $j^{th}$ cut with the span being $k_i$ in the $i^{th}$ subnetwork, and storing the realization probability in the preferred path parsing module;

S5: computing the mass entropy $$E_{ij}^{Mk_i}$$

with the realization probability being $$p_{ij}^{Mk_i}$$

of the $j^{th}$ cut with the span being $k_i$ in the $i^{th}$ subnetwork, and storing the mass entropy in the preferred path parsing module;

S6: computing and labeling the total mass entropy of the $l^{th}$ subnetwork as $$E_Z^M,$$

and storing the total mass entropy in the preferred path parsing module;

S7: computing the maximum mass entropy $$E_{max}^M$$

of the $l^{th}$ subnetwork, and storing the maximum mass entropy in the preferred path parsing module;

S8: computing the minimal mass entropy $$E_{min}^M$$

of the $l^{th}$ subnetwork, and storing the minimal mass entropy in the preferred path parsing module; and S9: computing the optimal mass $$R_{max}^T$$

of the information stream through the $l^{th}$ subnetwork on the path, and storing the optimal mass in the preferred result storage module.

The optimal scheduling is realized according to the joint optimization degree of the computing and storing path of the computing power network, with the basic flow including:

Sa: the maximum time efficacy of the information stream of a certain path in the storage module is called and labeled as $$R_{max}^T,$$

the optimal mass of the information stream is labeled as $$R_{max}^M,$$

which is stored in the preferred result storage module;

Sb: $\alpha_1 \geq 0$, $\alpha_3 \geq 0$, $\alpha_1 + \alpha_2 = 1$; is given and recorded in the parsing module; and Sc:

$$R_{max}^{AD}, R_{max}^{AD} = \alpha_1 R_{max}^T + \alpha_2 R_{max}^M,$$

is computed and stored in the preferred result storage module.

Figure 2:
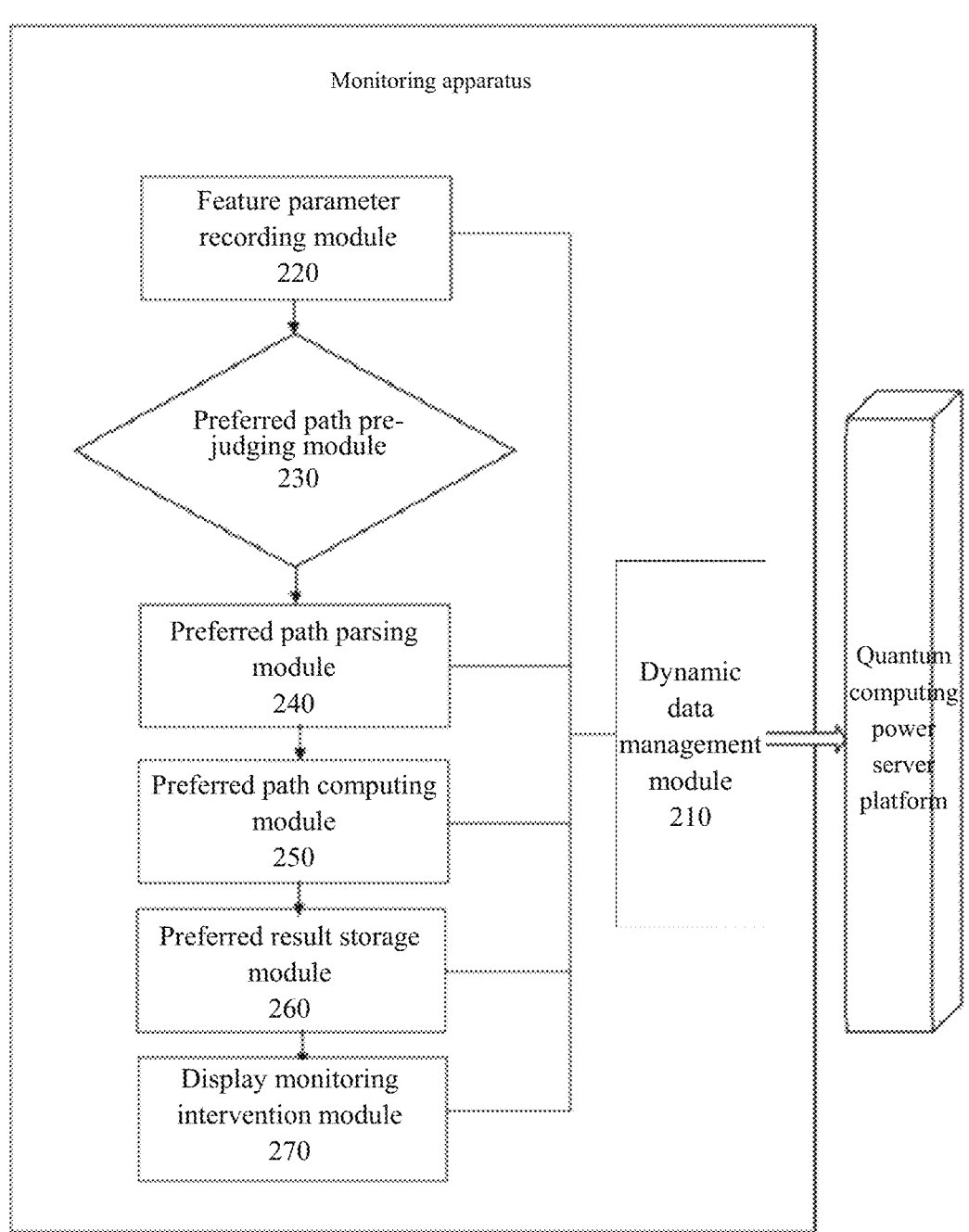
FIG. 2 is a schematic structural diagram of a monitoring apparatus provided by the present disclosure.

Referring to FIG. 2, FIG. 2 is a schematic structural diagram of a monitoring apparatus provided by the present disclosure.

The monitoring apparatus provided in the embodiment of the present disclosure is applied to the method for determining an optimal computing and storing path of a computing power network provided in the embodiment, including:

a dynamic data management module 210, configured to record, store or call data;

a path parameter recording module 220, configured to record and store a feature information value and a quantity value of the computing and storing path of the computing power network;

a preferred path pre-judging module 230, configured to pre-judge a type of the computing and storing path of the computing power network;

a preferred path parsing module 240, configured to parse data of the computing and storing path of the computing power network;

a preferred path computing module 250, configured to compute the maximum time efficacy, the optimal mass, and the joint optimization degree of the computing and storing path of the computing power network;

a preferred result storage module 260, configured to store a single index computed value and a comprehensive computed value of the computing and storing path of the computing power network; and a display monitoring intervention module 270, configured to display a data feature of the computing and storing path of the computing power network.

In the embodiment of the present disclosure, started from an engineering practical process, an AI smart monitoring apparatus is designed based on the method for determining an optimal computing and storing path of a computing power network, and a method for designing the monitoring apparatus for the optimal computing and storing path of the computing power network and a systematic working flow-chart (referring to FIG. 7) of the monitoring apparatus are given. A physical monitoring apparatus is converted into an AI smart system to play a role of defining a data center with software, thereby realizing intelligent decision making of the optimal scheduling of the computing and storing path of the computing power network.

The modules in the monitoring apparatus are described in detail below:

1. The dynamic data management module 210 includes various types of data exchanging with the functional modules in terms of a database, recorded, stored or called data, preset data in advance, intermediate data needed to be stored and the like, including the following user layer, application server layer, the data layer and the like respectively.

The user layer S1 can select and schedule the data of the computing and storing path of the computing power network and perform data interaction with the data layer. That is, in the computing power network, the module layer realizes data exchange with the functional modules in the process of optimizing the computing and "path" to be selected.

The application server layer S2 is an intermediate layer arranged between the data layer and the user layer, and is configured to realize uniform database management, knowledge base management, access to the database by the user, to protect safety and work efficiency of the database and the like. A user interface is connected to the data layer through the intermediate layer.

Database management includes user and right management, and different users are assigned with different rights.

Knowledge base management refers to management and maintenance of a data bank, an information statistical database, and the like, including addition, deletion, edition, query of information, and the like.

The data layer S3 is configured to store or call data, including the data meeting optimization of the computing and storing path of the computing power network and the stored or called data in the functional modules of the links of the computing and storing path of the computing power network to be optimized, a part of data communicating with the database, the preset data in advance, the intermediate data needed to be stored, and the like, thereby playing a role of a data storage library.

The stored or called data includes initial state data to be computed, intermediate operational data, analytical process data, itemized operational data, integrated data and the like of time efficacy data and mass data associated with the computing and storing path of the computing power network.

2. The path parameter recording module 220 includes: recording network features (the total quantity 1 of the subnetworks, the cuts j, the nodes i, and the span ki) of each path of the distributed topological structure path set (or an active network structure) corresponding to the computing and storing path of the computing power network and storing the network features; recording single parameter information of the computing and storing path of the computing power network to be optimized, and storing the same;

recording the initial state data of the time efficacy and mass associated with the computing and storing path of the computing power network and the intermediate data to be processed, and storing the same; and recording all information of the data layer of the dynamic data management module.

3. The preferred path pre-judging module 230 includes: giving a class of single optimization of the optimized computing and storing path to differentiate different classes for judgment.

A pre-judging module B1 judges the optimized computing and storing path which is classified as class 1 in a case that the maximum time efficacy is solved.

A pre-judging module B2 judges the optimized computing and storing path which is classified as class 2 in a case that the optimal mass is solved.

A pre-judging module B3 judges the optimized computing and storing path which is classified as class 3 in a case that the joint optimization degree is solved.

4. The preferred path parsing module 240 is respectively shifted to the following modules according to the data features of the optimized computing and storing path of the computing power network:

a parsing module C1 parses the initial state data, intermediate operational data, analysis process data, and itemized operational data of the optimized computing and storing path of the computing power network; and a parsing module C2 parses the maximum time efficacy and the optimal mass weight coefficient numerical value of the optimized computing and storing path of the computing power network.

5. The preferred path computing module 250 includes: differentiating the type of the optimized computing and storing path of the computing power network with the maximum time efficacy, the optimal mass, and the formula, algorithm, and model of the joint optimization degree of the optimized computing and storing path of the computing power network. According to the maximum time efficacy, the optimal mass, and the joint optimization degree of the optimized computing and storing path of the computing power network, the module is respectively shifted into the following modules with the corresponding computing formula, algorithm, and model:

a computing module D1 calls the parse data of the parsing module B1 for the information stream of the computing and storing path of the computing power network to be optimized, and the basic steps: S2-S12 of optimal scheduling are realized according to the maximum time efficacy, substituting corresponding formulae, algorithms, and models;

a computing module D2 calls the parse data of the parsing module B1 for the information stream of the computing and storing path of the computing power network to be optimized, and the basic steps: S2-S9 of optimal scheduling are realized according to the optimal mass, substituting corresponding formulae, algorithms, and models; and a computing module D3 calls the parse data of the parsing module B2 for the information stream of the computing and storing path of the computing power network to be optimized, and the basic steps: Sa-Sc of optimal scheduling are realized according to the joint optimization degree, substituting corresponding formulae, algorithms, and models.

6. The preferred result storage module 260 includes: counting a single index computed value and a comprehensive computed value of the computing and storing path of the computing power network and is shifted to the data layer of the dynamic data management module.

The module is respectively shifted to the following modules according to the data features of the optimized computing and storing path of the computing power network:

a storage module E1 stores the itemized computing process data of the maximum time efficacy of the computing and storing path of the computing power network and the maximum time efficacy;

a storage module E2 stores the itemized computing process data of the optimal mass of the computing and storing path of the computing power network and the optimal mass; and a storage module E3 stores the maximum time efficacy weight coefficient, the optimal mass weight coefficient, and the computed value of the joint optimization degree of the computing and storing path of the computing power network.

7. The display monitoring intervention module 270 includes process display, intervention display, and result display, and is respectively shifted to the following modules according to the data features of the optimized computing and storing path of the computing power network:

a process display module F1 calls display of initial state data and intermediate operational process data of the computing and storing path of the computing power network in the data layer;

an intervention display module F2 calls display of adjustment data of related parameters participating in a preferred operation process, the weight coefficient of the maximum time efficacy, and the weight coefficient of the optimal mass of the computing and storing path of the computing power network in the data layer;

a result display module F3 calls the maximum time efficiency and obtains an itemized computed value of the maximum time efficacy, calls the optimal mass and obtains an itemized computed value of the optimal mass, and calls the computed value of the joint optimization degree, judges the type, and is shifted to the following display modules:

a result display module F31 displays the maximum time efficacy and obtains the itemized computed value of the maximum time efficacy;

a result display module F32 displays the optimal mass and obtains the itemized computed value of the optimal mass; and a result display module F33 displays the computed value of the joint optimization degree.

The flow of working modules of the intelligent optimal scheduling of the computing and storing path of the computing power network is formed according to the above flow.

According to the monitoring apparatus provided in the embodiment of the present disclosure, in a distributed topological structure of the computing power network formed by a plurality of complex networks, the optimal path for computing and storing information transmission of the computing power network is optimized, so that the computing and storing capacities of the computing power network and the time validity, accuracy, and reliability of a computing and storing process of the computing power network are enhanced.

The apparatus embodiment described above is merely schematic, where units described as separate components may or may not be physically separated, and a component displayed as a unit may or may not be a physical unit, that is, the component may be located at one place, or distributed on a plurality of network units. Part or all of the modules may be selected according to actual requirements to achieve the objective of the solution of the embodiments. Those of ordinary skill in the art may understand and implement the present disclosure without making creative efforts.

From the description of the above-mentioned embodiments, it may be apparent to those skilled in the art that each implementation may be achieved by means of software plus a general-purpose hardware platform, and certainly may also be achieved by means of hardware. On the basis of the understanding, the technical solution mentioned above may be embodied in a form of a software product in essence or a part contributing to the prior art, and the computer software product can be stored in a computer readable storage medium (for example, a ROM/RAM, a diskette, an optical disk, etc.), and includes a plurality of instructions for enabling a computer device (like a personal computer, a server or a network device, etc.) to execute the method described in various embodiments or some parts of the embodiments.

Finally, it is to be noted that the above embodiments are merely used for explaining the technical solution of the present disclosure rather than limiting the present disclosure. Despite reference to the aforementioned embodiments to make a detailed description for the present disclosure, it will be understood by those skilled in the art that they still can modify the technical scheme recorded by the aforementioned embodiments or make equivalent substitutions on part of technical features therein. Such modifications or substitutions do not deviate the nature of the technical solution from the spirit and scope of the technical solution embodied in the embodiments according to the present disclosure.

What is claimed is:

1. A method for determining an optimal computing and storing path of a computing power network, comprising:

determining a time efficacy microscopic state of the computing and storing path of the computing power network according to a distributed topological structure corresponding to the computing power network to determine a maximum time efficacy entropy;

determining a minimal time efficacy entropy according to a total time efficacy entropy and the maximum time efficacy entropy of the computing and storing path of the computing power network, and determining a maximum time efficacy of an information stream of the computing and storing path of the computing power network according to the minimal time efficacy entropy;

determining a total mass entropy according to a connection span of the computing and storing path of the computing power network, and determining a maximum mass entropy according to a mass microscopic state of the computing and storing path of the computing power network;

determining a minimal mass entropy according to the total mass entropy and the maximum mass entropy, and determining an optimal mass of the information stream of the computing and storing path of the computing power network according to the minimal mass entropy; and determining a joint optimization degree of the information stream of the computing and storing path of the computing power network according to the maximum time efficacy, the optimal mass, and set weight coefficients, and determining an optimal computing and storing path of the computing power network according to the joint optimization degree.

2. The method for determining an optimal computing and storing path of a computing power network according to claim 1, wherein before the determining a time efficacy microscopic state of the computing and storing path of the computing power network according to a distributed topological structure corresponding to the computing power network to determine a maximum time efficacy entropy, the method further comprises:

determining the time efficacy microscopic state according to the connection span and a connection quantity of the computing and storing path of the computing power network; and determining the total time efficacy entropy according to the time efficacy microscopic state.

3. The method for determining an optimal computing and storing path of a computing power network according to claim 1, wherein the determining a maximum mass entropy according to a mass microscopic state of the computing and storing path of the computing power network comprises:

determining a realization probability value of the mass microscopic state according to the mass microscopic state of the computing and storing path of the computing power network; and determining the maximum mass entropy according to the realization probability value of the mass microscopic state.

4. A monitoring apparatus, applied to the method for determining an optimal computing and storing path of a computing power network according to claim 1, comprising:

a dynamic data management module, configured to record, store or call data;

a path parameter recording module, configured to record and store a feature information value and a quantity value of the computing and storing path of the computing power network;

a preferred path pre-judging module, configured to pre-judge a type of the computing and storing path of the computing power network;

a preferred path parsing module, configured to parse data of the computing and storing path of the computing power network;

a preferred path computing module, configured to compute the maximum time efficacy, the optimal mass, and the joint optimization degree of the computing and storing path of the computing power network;

a preferred result storage module, configured to store a single index computed value and a comprehensive computed value of the computing and storing path of the computing power network; and a display monitoring intervention module, configured to display a data feature of the computing and storing path of the computing power network.

5. The monitoring apparatus according to claim 4, wherein the dynamic data management module comprises:

a user layer, configured to select and schedule the data of the computing and storing path of the computing power network and to perform data interaction with a data layer; and an application server layer, arranged between the user layer and the data layer and configured to manage the data;

wherein the data layer is configured to store or call the data.

6. The monitoring apparatus according to claim 4, wherein the preferred path pre-judging module comprises a plurality of pre-judging modules that are configured to pre-judge the type of the computing and storing path of the computing power network.

7. The monitoring apparatus according to claim 4, wherein the preferred path parsing module comprises a plurality of parsing modules that are configured to parse initial state data, intermediate operational data, analysis process data, and itemized operational data of the computing and storing path of the computing power network; and the parsing modules are further configured to parse the weight coefficient of the maximum time efficacy and the weight coefficient of the optimal mass in the joint optimization degree of the computing and storing path of the computing power network.

8. The monitoring apparatus according to claim 7, wherein the preferred path computing module comprises a plurality of computing modules that are configured to compute the maximum time efficacy, the optimal mass, and the joint optimization degree according to the data of the parsing modules.

9. The monitoring apparatus according to claim 4, wherein the preferred result storage module comprises a plurality of storage modules that are configured to store the itemized computing process data of the maximum time efficacy of the computing and storing path of the computing power network and the maximum time efficacy; and the storage modules are further configured to store the itemized computing process data of the optimal mass of the computing and storing path of the computing power network and the optimal mass; and the storage modules are further configured to store the weight coefficient of the maximum time efficacy, the weight coefficient of the optimal mass, and the computed value of the joint optimization degree of the computing and storing path of the computing power network.

10. The monitoring apparatus according to claim 4, wherein the display monitoring intervention module comprises:

a process display module, configured to display initial state data and intermediate operational process data of the computing and storing path of the computing power network;

an intervention display module, configured to display adjustment data of related parameters participating in a preferred operation process, the weight coefficient of the maximum time efficacy, and the weight coefficient of the optimal mass of the computing and storing path of the computing power network; and a result display module, configured to display the maximum time efficiency and an itemized computed value of the maximum time efficacy, the optimal mass and an itemized computed value of the optimal mass, and the joint optimization degree.

* * * * *